United States Patent

Hirota et al.

Patent Number: 6,064,749
Date of Patent: *May 16, 2000

[54] HYBRID TRACKING FOR AUGMENTED REALITY USING BOTH CAMERA MOTION DETECTION AND LANDMARK TRACKING

[76] Inventors: Gentaro Hirota, 100 Rockhaven Rd. #J101, Carrboro, N.C. 28510; Andrei State, 1100 Hwy. 54 Bypass #26G, Chapel Hill, N.C. 27516

[ * ] Notice: This patent issued on a continued prosecution application filed under 37 CFR 1.53(d), and is subject to the twenty year patent term provisions of 35 U.S.C. 154(a)(2).

[21] Appl. No.: 08/691,684

[22] Filed: Aug. 2, 1996

[51] Int. Cl.[7] .................................................. G06K 9/00
[52] U.S. Cl. ............................... 382/103; 345/7; 359/630
[58] Field of Search ........................... 382/100, 154, 382/162, 291, 294, 295; 345/285, 7–9, 419, 424, 473–474, 112–114, 435, 439; 356/12; 359/13, 630; 348/239, 586

[56] References Cited

U.S. PATENT DOCUMENTS

| | | | |
|---|---|---|---|
| 5,436,638 | 7/1995 | Bolas et al. | 345/156 |
| 5,446,834 | 8/1995 | Deering | 395/127 |
| 5,471,541 | 11/1995 | Burtnyk et al. | 382/153 |
| 5,483,961 | 1/1996 | Kelly et al. | 128/653.1 |
| 5,495,576 | 2/1996 | Ritchey | 395/125 |
| 5,526,022 | 6/1996 | Donahue et al. | 345/156 |
| 5,531,227 | 7/1996 | Schneider | 128/653.1 |
| 5,548,694 | 8/1996 | Gibson | 345/424 |
| 5,585,813 | 12/1996 | Howard | 345/8 |
| 5,606,627 | 2/1997 | Kuo | 382/154 |
| 5,613,013 | 3/1997 | Schuette | 382/124 |
| 5,625,765 | 4/1997 | Ellenby et al. | 395/135 |
| 5,706,195 | 1/1998 | Corby, Jr. et al. | 364/423.099 |
| 5,710,878 | 1/1998 | McCoy et al. | 345/419 |
| 5,717,414 | 2/1998 | Bergsneider et al. | 345/8 |
| 5,719,598 | 2/1998 | Latham | 345/419 |
| 5,850,352 | 12/1998 | Moezzi et al. | 348/13 |
| 5,889,951 | 3/1999 | Lombardi | 709/219 |
| 5,914,748 | 6/1999 | Parulski et al. | 348/239 |

OTHER PUBLICATIONS

M. Bajura and U. Neumann, Dynamic Registration Correction in Augmented–Reality Systems, Proceedings of the Virtual Reality Annual International Syumposium '95 (Mar. 11–15, 1995), Research Triangle Park, pp. 189–196 (1995).

M. Bajura and U. Neumann, Dynamic Registration Correction in Video–Based Augmented Reality Systems, IEEE Computer Graphics and Applications, pp. 52–60, (Sep. 1995).

R. Azuma, *A Survey of Augmented Reality*, SIGGRAPH 1995 Course Notes #9 (Developing Advanced Virtual Reality Applications), pp. 1–40 (1995).

(List continued on next page.)

*Primary Examiner*—Jon Chang
*Assistant Examiner*—Jayami K. Patel
*Attorney, Agent, or Firm*—Myers Bigel Sibley & Sajovec

[57] ABSTRACT

Systems, methods and computer program products which have the registration accuracy of vision-based tracking systems and the robustness of magnetic tracking systems. Video tracking of landmarks is utilized as the primary method for determining camera position and orientation but is enhanced by magnetic or other forms of physical tracking camera movement and orientation. A physical tracker narrows the landmark search area on images, speeding up the landmark search process. Information from the physical tracker may also be used to select one of several solutions of a non-linear equation resulting from the vision-based tracker. The physical tracker may also act as a primary tracker if the image analyzer cannot locate enough landmarks to provide proper registration, thus, avoiding complete loss of registration. Furthermore, if 1 or 2 landmarks (not enough for a unique solution) are detected, several may be utilized heuristic methods are used to minimize registration loss. Catastrophic failure may be avoided by monitoring the difference between results from the physical tracker and the vision-based tracker and discarding corrections that exceed a certain magnitude. The hybrid tracking system is equally applicable to see-through and video augmented reality systems.

35 Claims, 10 Drawing Sheets

OTHER PUBLICATIONS

R. Azuma and G. Bishop, Improving Static and Dynamic Registration in an Optical See–through HMD, SIGGRAPH 94 (Orlando, FL, Jul. 24–29, 1994), *Computer Graphics Proceedings, Annual Conference Series*, pp. 197–203 (1994).

M. Fischler and R. Bolles, Random Sample Consensus: A Paradigm for Model Fitting with Applications to Image Analysis and Automated Cartography, Communications of the ACM, vol. 24, No. 6, pp. 381–395 (Jun. 1981).

R. Holloway, Registration Errors in Augmented Reality Systems, Ph.D. dissertation, University of North Carolina at Chapel Hill (Aug. 1995).

A. Janin, et al., A videometric head tracker for augmented reality applications, *Proceedings of SPIE*, pp. 308–315 (Nov. 1994).

A. Kancherla, et al., A Novel Virtual Reality Tool for Teaching Dynamic 3D Anatomy, *Proceedings of CVRMed '95* (Nice, France, Apr. 3–5, 1995), pp. 163–169.

D. Lowe, Three–Dimensional Object Recognition from Single Two–Dimensional Images, *Artificial Intelligence*, 31 (1987), pp. 355–395.

D. Lowe, Robust Model–based Motion Tracking Through the Integration of Search and Estimation, *International Journal of Computer Vision*, 8:2 (1992), pp. 113–122.

J.P. Mellor, Realtime Camera Calibration for Enhanced Reality Visualization, *Proceedings of CVRMed '95* (Nice, France Apr. 305, 1995), pp. 471–475.

M. Mine, Characterization of End–to–End Delays in Head–Mounted Display Systems, *University of North Carolina at Chapel Hill Technical Report TR93–005* (Mar. 1993).

I. Sutherland, A head–mounted three dimensional display, *Fall Joint Computer Conference* (1968), pp. 757–764.

R. Tsai, A Versatile Camera Calibration Technique for High–Accuracy 3D Machine Vision Metrology Using Off–the–Shelf TV Cameras and Lenses, *IEEE Journal of Robotics and Automation*, vol. RA–3, No. 4 (Aug. 1987), pp. 323–344.

M. Tuceryan, et al., Calibration Requirements and Procedures for a Monitor–Based Augmented Reality System, *IEEE Transactions on Visualization and Computer Graphics*, vol. 1, No. 3 (Sep. 1995), pp. 255–273.

M. Uenohara and T. Kanade, Vision–Based Object Registration for Real–Time Image Overlay, 1995 Conference on Computer Vision, Virtual Reality and Robotics in Medicine (Nice, France, Apr. 1995), pp. 13–22.

L. Wang and W. Tsai, Computing Camera Parameters using Vanishing–Line Information from a Rectangular Parallelepiped, *Machine Vision and Applications* (1990), pp. 129–141.

M. Ward, et al., A Demonstrated Optical Tracker With Scalable Work Area for Head–Mounted Display Systems, *Proceedings of the 1992 Symposium on Interactive 3D Graphics* (Boston, MA, Mar. 1–Apr. 1, 1992), pp. 43–52.

T. Yoo and T. Olano, Instant Hole™ (Windows onto Reality), *University of North Carolina at Chapel Hill Technical Report TR93–027* (1993).

M. Bajura and U. Neumann, Dynamic Registration Correction in Augmented–Reality Systems, *University of North Carolina at Chapel Hill—Department of Computer Science Technical Report TR94–022*.

HYBRID TRACKING FOR AUGMENTED REALITY USING BOTH CAMERA MOTION DETECTION AND LANDMARK TRACKING

This invention was made with government support under Defense Advanced Research Projects Agency grant number DABT63-93-C-0048. The government has certain rights in this invention.

FIELD OF THE INVENTION

The present invention relates generally to augmented reality and more particularly to registration of computer generated graphics to real world objects or images of real world objects.

BACKGROUND OF THE INVENTION

While the advent of Head-Mounted Displays (HMDs) and affordable real-time computer graphics engines has given rise to much research in the field of Virtual Reality (VR), comparatively little work has been done in the field of Augmented Reality (AR). A VR system immerses the user in a totally synthetic computer-generated environment. An AR system, on the other hand, merges computer synthesized objects with the user's space in the real world. In an AR system, computer generated graphics enhance the user's interaction with, or perception of, the real world.

For AR systems to become truly beneficial, these systems should provide accurate registration between computer generated graphics and real objects. A virtual object should appear at its proper place in the real world, otherwise the user it is difficult for the user to correctly determine spatial relationships. Furthermore, the registration of the computer generated graphics should be dynamic in that it can account for changes in the real world perspective. Dynamic registration is particularly important when the user moves around in the environment. The relative position between real and computer generated (synthetic) objects should be constant.

An AR system must also provide a reasonable image generation rate (10 Hz) and stereopsis. Both image generation rate and stereosis are important for good depth perception. The lack of kinetic or stereoscopic depth cues greatly reduces the believability of an augmented environment.

An AR system should also be simple to set up and use. Users of AR applications should not have to be familiar with the specific techniques used in AR systems. As many of the applications of augmented reality environments involve tasks which are carried out by users who are typically not versed in the intricacies of computer graphics systems, a simple set up and use are important to the proliferation of AR systems.

The AR system should also put minimal constraints on user motion. In many applications the user wants to move without restriction.

Finally, an AR system should have minimal latency. There should be as little as possible delay between the user's movement and the display update. Reduction in latency between movement and reflection of that movement in the environment is generally required for smooth and effective interaction.

Among the requirements for an effective AR system, the accurate registration of the computer generated graphics can have a significant impact on the perception of the augmented reality. To the best of the inventors' knowledge, typical existing AR systems do not convincingly meet this requirement. Typically, in current AR systems, a virtual object appears to swim about as the user moves, and often does not appear to rest at the same spot when viewed from several different positions. In current AR systems, most of these registration errors are due to the limitations of the tracking systems.

Conventional magnetic trackers may be subject to large amounts of error and jitter. An uncalibrated system can exhibit errors of 10 cm or more, particularly in the presence of magnetic field disturbances such as metal and electric equipment. Carefully calibrating a magnetic system typically does not reduce position errors to much less than about 2 cm. Despite their lack of accuracy, magnetic trackers are popular because they are robust and place minimal constraints on user motion.

Other existing AR systems have used mechanical or optical tracking systems. Both of these systems generally have better accuracy than magnetic trackers, but may be burdensome. Mechanical systems often tether the user and generally have a limited working volume. The optical tracker also generally requires four dedicated tracking cameras mounted on the user's HMD.

Another method of tracking is a vision-based tracking system which uses image recognition to track movement. In a video see-through AR system, video images of the user's view are available. However, recovering 3D information from 2D images is generally difficult. One common problem of utilizing image recognition to track movement and register computer generated graphics in a VR system is that an almost infinite number of possibilities may need to be considered for the images to be interpreted correctly. Model-based vision which assumes a prior knowledge of the 3D geometry of visible objects reduces the problem from shape recovery to mere camera motion tracking, however, even by simplifying the problem this way, model-based vision methods typically still extract object features from images. This generally involves special-purpose image processing hardware to achieve real-time updates. Despite the speed and complexity disadvantages of a vision-based system, nearly perfect registration can be achieved under certain conditions.

One possible problem of vision-based methods is their instability. To save computation cost, vision based systems often make numerous assumptions about the working environment and the user's movements, but those assumptions may be impractical. For example, vision-based systems typically assume temporal coherence of camera movement in order to avoid frequent use of costly search algorithms that establish the correspondence between image features and model features. Thus, vision-based systems may be unable to keep up with quick, abrupt user movements. Furthermore, typical vision based trackers can become unstable from the occlusion of features caused by deformable objects (e.g. hands). If a vision tracker's assumptions fail, the results can be catastrophic. Since image analysis and correspondence finding may be costly and error-prone, and because landmarks can be occluded, obscured, or may disappear from the camera's view at any time, it is generally impractical to attempt to continuously track a large number of features in real time.

In view of the above, there exists a need for improvement in AR systems to allow for highly accurate registration of computer generated graphics while still providing acceptable performance in terms of frame rate, freedom of movement of the user, simplicity of setup and use and acceptable latency between motion and reflection of that motion in the augmented environment.

OBJECTS AND SUMMARY OF THE INVENTION

In view of the above limitations, it is an object of the present invention to provide a augmented reality system that allows free movement of the user.

It is a further object of the present invention to provide a registration system for registering computer graphics to images which is both accurate and allows sufficiently high frame rates to provide video capability.

Another object of the present invention is to reduce latency in augmented reality systems.

These and other objects of the present invention are provided by a hybrid tracking system which has the registration accuracy of vision-based tracking systems and the robustness of magnetic tracking systems. Video tracking of landmarks is utilized as the primary method for determining camera position and orientation but is enhanced by magnetic or other forms of physical tracking camera position and orientation. Preferably, fiducials are utilized as the landmarks. This tracking method can thereby inherit the accuracy of some vision-based methods, but can avoid unnecessary computational cost and can reduce the demands on the image analyzer. A global non-linear equation solver and a local least square minimizer reduce the burden on the image analyzer.

The result of the vision-based tracker is also used for on the-fly calibration of the magnetic or other physical tracker, which enhances the vision-based tracker. The magnetic tracker narrows the landmark search area on images, speeding up the landmark search process. Information from the magnetic tracker may also be used to select one of several solutions of a non-linear equation resulting from the vision-based tracker. The magnetic tracker may also act as a primary tracker if the image analyzer cannot locate enough landmarks to provide proper registration, thus, avoiding complete loss of registration. Furthermore, if only 1 or 2 landmarks (not enough for a unique solution) are detected, several heuristic methods may be used to minimize registration loss. Finally, catastrophic failure is avoided by monitoring the difference between results from the physical tracker and the vision-based tracker and discarding corrections that exceed a certain magnitude.

Color-coding the landmarks helps the system to quickly identify and distinguish between landmarks. This not only eases system setup and improves performance but also lets the system handle abrupt user movement.

One particular embodiment of the present invention provides for registering computer generated graphic to an image wherein the image corresponds to the field of view of a user operated camera. The computer generated graphic is registered to the image based upon both the determined location of a landmark within the image and the position of the camera which generated the image.

In a further embodiment of the present invention the computer generated graphic is registered to an image by obtaining a first image corresponding to the field of view of the camera and determining the location within the first image of a landmark to create an initial landmark location value. The movement of the user operated camera is detected to create a camera displacement value. A second image corresponding to the field of view of the camera is obtained and the location of the landmark within the second image is predicted based on the camera displacement value and the initial landmark location value. A search region within the second image is defined based upon the predicted location of the landmark within the second image and the landmark is located within the defined search region of the second image to create an actual landmark location. The computer generated graphic is registered to the second image based upon the actual landmark location.

In a further embodiment of the present invention the actual landmark location within the second image is compared with the predicted location of the landmark to generate a prediction error value and the camera location based upon the prediction error value is updated.

The head pose of the camera may also be determined based upon the actual landmark location and the computer generated graphic registered to the image based upon the determined head pose of the camera. Furthermore, the determinations may be made based upon a plurality of landmarks in the image.

When a plurality of landmarks are present, the number of landmarks located within the region may be evaluated to determine whether a sufficient number of landmarks have been located within the image to register the computer generated graphic based upon actual landmark location. If a sufficient number have not been located the computer generated graphic is registered based upon the camera displacement value. The landmarks may also comprise fiducials.

The number of landmarks located within the region may also be evaluated to determine if three or more landmarks have been located within the image. If three or more landmarks are present, then the head pose may be determined utilizing a global analytical solution. A final solution to the global analytical solution may also be determined based upon the camera displacement value. The number of landmarks located within the region may further be evaluated to determine if only one or two landmarks have been located within the image. In such a case, the head pose comprises determining the head pose utilizing a local heuristic corrector and the camera displacement value.

In still another embodiment of the present invention, a landmark for use in image recognition is provided. The landmark includes a first dot of a first color and a ring concentric to the first dot. The ring is of a second color different from the first color. Preferably, the diameter of the ring is about three times the diameter of the dot.

As will be appreciated by those of skill in this art, many of the above described aspects of the present invention may be provided as methods, apparatus (systems) or computer program products. Moreover, many of the above described aspects of the present invention may be used individually or in combination to provide improved augmented reality.

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system or program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable computer readable medium may be utilized including hard disks, CD-ROMs, optical storage devices, or magnetic storage devices.

Figure 1:
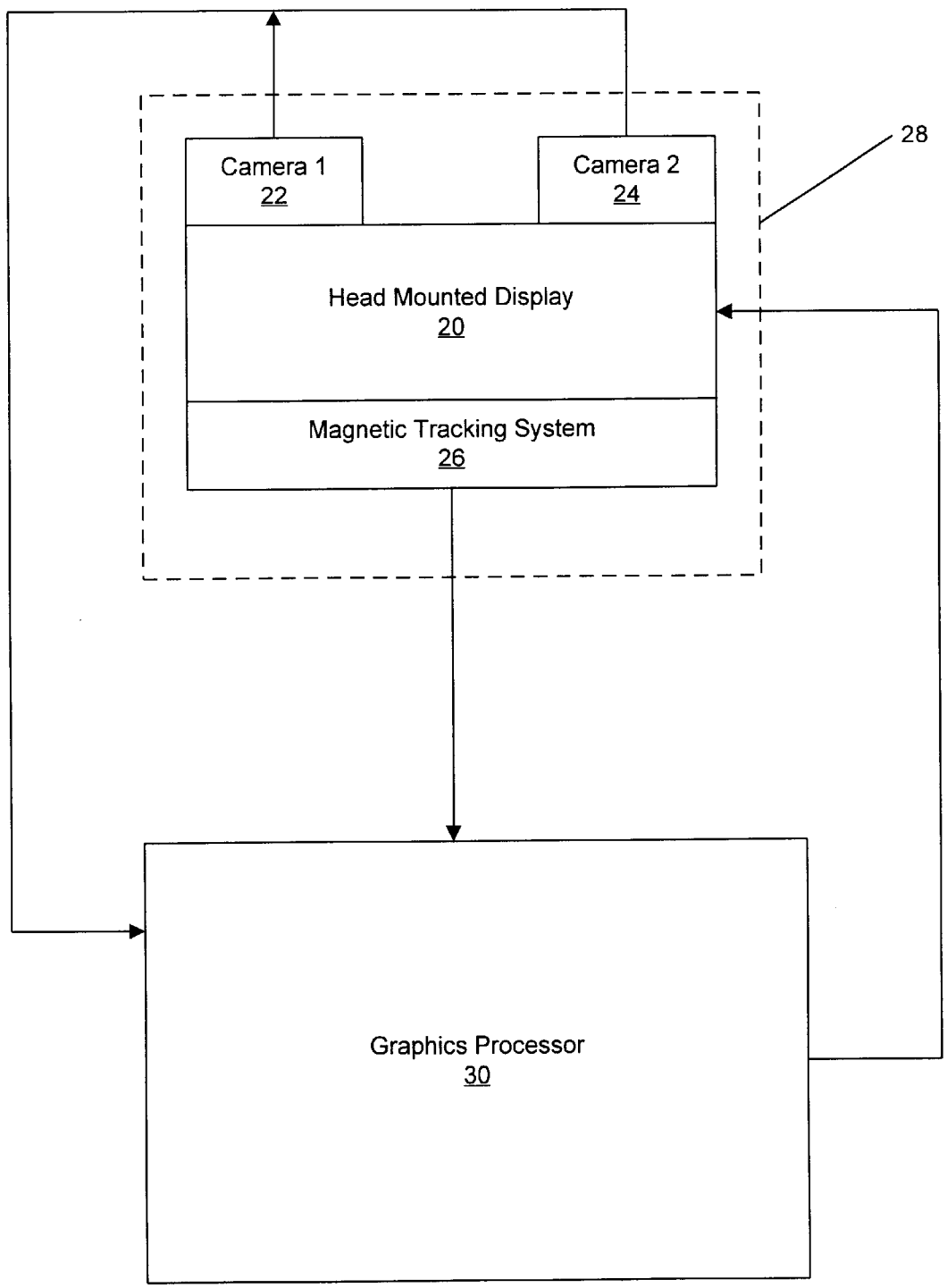
FIG. 1 is block diagram of an augmented reality system according to the present invention.

FIG. 1 illustrates an augmented reality system according to the present invention. As seen in FIG. 1, a head mounted unit 28 includes a head mounted display 20 (HMD) with two cameras 22 and 24 rigidly attached to the head mounted display. A suitable head mounted display for use in the present invention include the Virtual Research VR-4 head mounted display or similar head mounted displays known to those of skill in the art. Suitable cameras for use with the present invention include Panasonic GP-KS 102 CCD video cameras with Cosmicar F1.8 12.5 mm lenses (28 field of view, selected for minimal optical distortion) or other such video cameras known to those of skill in the art. The head mounted unit 28 also includes a physical tracking system such as the magnetic tracking system 26 illustrated in FIG. 1. Suitable tracking systems include the Ascension Flock of Birds (TM) magnetic tracker with Extended Range Transmitter with the magnetic tracking sensor attached to the HMD. The head mounted unit 28 is worn by a user which views the augmented reality in the head mounted display 20. The movement of the user is communicated to the graphics processor 30 by the magnetic tracking system 26.

The two cameras 22 and 24 are arranged so as to provide stereoscopic images to a graphics processor 30. Graphics processors such as the Silicon Graphics Onyx (TM) RealityEngine$^{2TM}$ graphics workstation equipped with a Sirius Video™ real-time video capture device, and a Multi-Channel Option™ or the like may be utilized in practicing the present invention. The HMD-mounted cameras 22 and 24 are preferably mounted about 64 mm apart to approximate the typical interpupillary distance for humans. The cameras are also preferably oriented with a convergence angle of 4° for sufficient stereo overlap in a tabletop working environment. The convergence angle may vary depending upon the application as the distance of the objects of interest from the user may vary from application to application.

The cameras provide either an analog or digital video signal to the graphics processor 30. The graphics processor 30 captures the stereo video images from the head mounted cameras 22 and 24 in real-time and transfers the images to an internal graphics frame buffer of the RealityEngine$^{2TM}$. The graphics processor 30 creates the augmented reality environment by adding to the images provided by the two cameras 22 and 24 computer generated graphics. These composite images are then displayed on the head mounted display 20 by the graphics processor 30.

While the present system is described with respect to a two camera stereoscopic system, as will be appreciated by those of skill in the art, the teachings of the present invention may also be utilized in single camera monocular systems or in systems with more than two cameras. Furthermore, while the present invention is described with respect to specific hardware utilized by the inventors, other hardware capable of carrying out the functions, operation and actions of the present invention may also be utilized in practicing the present invention.

Furthermore, as will be understood by one of skill in the art, the present system need not be limited to augmented reality systems utilizing a composite video image but may also be utilized in see-through augmented reality systems in which only the computer generated graphics are presented to the user which then views the graphics on a see-through lens with the real world in the background. In a see-through system, the cameras would generate images which would be utilized by the vision-based subsystem of the present invention to locate landmarks within the field of view of the user. The only difference between the two systems would be in a translation of the camera coordinates to eye coordinates to compensate for the change in perspective between the camera images and the actual real world perspective of the user. In either case, computer generated graphics are registered to objects in the real world. In the composite video case the registration orients the graphics to objects and combines them with an video image of the real world. In the see-through case, however, the registration is to the point of view of the user's eye rather than the camera point of view and the computer generated graphic is combined with the real world object by the user rather than in the creation of a composite video image. Accordingly, references herein to registering a computer generated graphic to objects in the real world refers to registering computer generated graphics to objects observed in the environment from either the camera point of view in a composite video system or the user's point of view in a see-through system.

In operation, the hybrid tracking system of the present invention analyzes sensor data from two input streams: real-time video images from the stereo cameras 22 and 24, and tracking reports from the magnetic tracking sensor 26. The result of this analysis is information about "head pose." As used herein, head pose refers to the position and orientation of the HMD-cameras-sensor assembly and may be utilized to register computer generated graphics to images from the cameras. As described herein, the system assumes that the two cameras 22 and 24 and the tracking sensor 26 are rigidly interconnected and are rigidly attached to the HMD and the user's head. Accordingly, it is preferred that a fixed relationship exists between the user's head, the cameras and the tracking sensor exists. The geometry of this assembly should be known and the transformations between the various coordinate systems (cameras, sensor, user sight) been determined via calibration procedures. However, if the interrelationship between motion of the user's head, the tracking system and the cameras are known, such motion could be compensated for in the present invention. It is also preferred that the world space positions of the landmarks used in the vision-based tracking algorithm are precisely calibrated. Suitable calibration procedures are described herein.

Because the geometry of the system is known or determinable, the registration of the computer generated graphic may be made based upon the head pose information resulting from the hybrid tracking system. Such procedures are known to those of skill in the art.

System Overview

The operation of a system according to the present invention will now be generally described with reference to FIGS. 1 and 2.

For each stereo image pair (i.e. frame), the hybrid tracking system of the present invention attempts to determine the head pose from landmarks' positions in the images. As used herein, the term landmark refers to a feature within an image which has a known position with respect to objects within the image. The term fiducial refers to landmarks which are added to objects to facilitate registration.

If the hybrid tracking system is successful in determining head pose from landmarks in an image then an error-correcting transformation between the magnetic tracker reading and the head pose computed by the vision-based tracker is determined. This error correcting transformation is referred to herein as the magnetic tracker error.

As additional frames are received from the cameras 22 and 24, the magnetic tracker error computed in one frame is used in conjunction with the magnetic tracker position information to predict the head pose in the next frame (temporal coherence). This prediction is subsequently used to compute the expected positions of the landmarks in image space.

Figure 2:
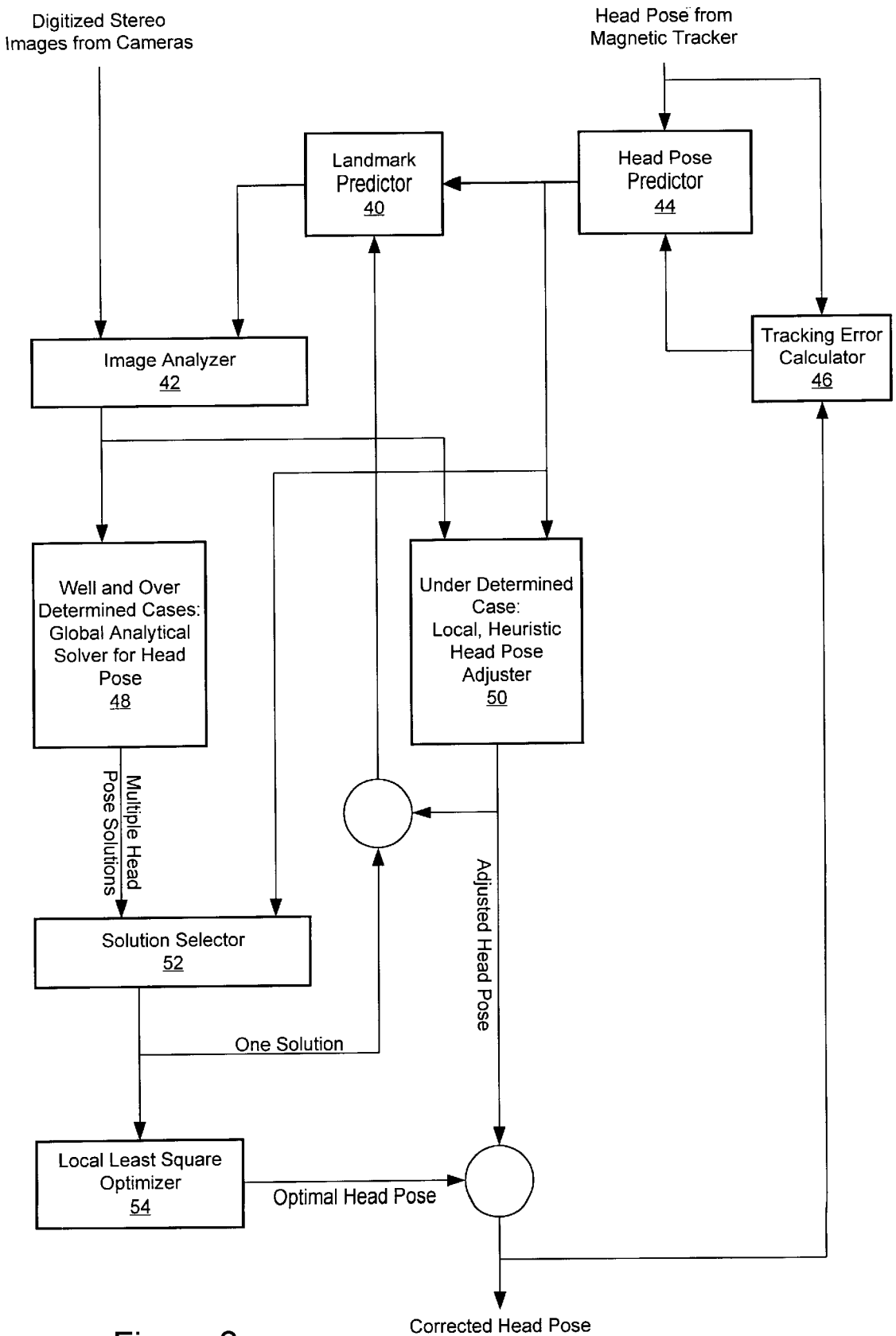
FIG. 2 is a flow diagram of a hybrid tracking system according to the present invention.

The logical components and the flow of data in the hybrid tracking system of the present invention are illustrated in FIG. 2. As seen in FIG. 2, an Image Analyzer 42 locates landmarks within an image and receives images from the stereo cameras 22 and 24 and receives predicted landmark locations from the Landmark Predictor 40. The Image Analyzer 42 outputs landmark positions to the Global Analytical Solver 48 and the Local Heuristic Head Pose Adjuster 50. The Head Pose Predictor 44 receives input from the magnetic tracking system 26 and from the Tracking Error Calculator 46. The Head Pose Predictor 44 predicts the head pose based upon the magnetic tracking system information and the tracking error and provides the predicted head pose to the Landmark Predictor 40, the Local Heuristic Head Pose Adjuster 50 and the Solution Selector 52. The Landmark Predictor 40 predicts the locations of landmarks from the previously determined locations of landmarks, either by the Solution Selector 52 or the Local Heuristic Head Pose Adjuster 50 and from the Head Post Predictor 44.

The Global Analytical Solver 48 utilizes the landmark locations from the Image Analyzer 42 to generate head pose solutions for the well-determined and over-determined cases of three or more located landmarks. The Global Analytical Solver provides the multiple head pose solutions to the Solution Selector 52 which selects one solution and provides that solution to the Local Least Square Optimizer 54 which determines the optimal head pose for the well-determined and over-determined cases and to the Landmark Predictor 40 for the prediction of other landmark locations. This optimal head pose is the utilized as the corrected head pose for registration and by the Tracking Error Calculator 46 to determine the error in the magnetic tracking system 26.

In the under-determined case, the Local Heuristic Head Pose Adjuster 50 determines the head pose from the magnetic information of the Head Pose Predictor 44 and any landmarks locations from the Image Analyzer 42. The adjusted head pose determined by the Local Heuristic Head Pose Adjuster 50 is provided to the Landmark Predictor 40 for determination of additional landmark locations and is utilized as the corrected head pose for registration and by the Tracking Error Calculator 46.

At startup, the magnetic tracker error in the Tracking Error Calculator 46 is initialized to zero. The Head Pose Predictor 44, therefore, passes the readings from the magnetic tracker unchanged to the Landmark Predictor 40, which computes the expected image-space search areas for the landmarks. Using this data as a starting point, the Image Analyzer 42 searches for landmarks in the video images received from the video cameras 22 and 24.

As soon as the first landmark is detected in the image, the head pose is adjusted by the Local Heuristic Head Pose Adjuster 50 via a simple heuristic to line up the detected landmark in image space. For example, such a heuristic adjustment is described in Bajura, M. and Neumann, U. in Dynamic Registration Correction in Video-Based Augmented Reality Systems, *IEEE Computer Graphics and Applications* (September 1995), pp. 52–60, the disclosure of which is incorporated herein by reference. In the case of a single landmark, the resulting adjusted head pose adjusts only head orientation which is fed back to the Landmark Predictor 40 for re-prediction of landmark search areas. The system uses these improved values to find additional landmarks, thus iteratively refining its knowledge about the head pose.

Each time a new landmark is found, an appropriate head pose adjuster 50 or solver 48 is invoked depending on the total number of landmarks detected. There are two distinct cases:

(1) If the number of detected landmarks is not sufficient to completely determine the head pose (under-determined cases), the methods used are local, heuristic position and/or orientation adjusters such as the single-landmark method mentioned above and described in more detail below and referred to in block 50.

(2) In well-determined and over-determined cases, a global, analytical solver 48 is invoked. This solver may compute multiple solutions, in which case a Solution Selector 52 is invoked. The selector attempts to pick a solution by verifying the consistency of all detected landmarks but is not always able to determine a single best solution. In particular, in situations in which only 3 different landmarks are visible in both cameras the sensor readings from the magnetic tracker 26 are utilized to determine which solution is correct.

In all cases, under-, well- and over-determined, the computed or adjusted head poses are first subjected to sanity checks. Then they are fed back to the Landmark Predictor 40 to iteratively detect additional landmarks. This process continues until a maximum preset number have been found or until all landmarks in the two stereo images have been found.

The solutions resulting from well- or over-determined cases are stabilized by a Local Least-Square Optimizer 54. If the head pose remains under-determined even after exhaustive search for additional landmarks, the partial correction derived by the most recently invoked heuristic adjuster(s) is retained.

The magnetic tracker error (whether computed and optimized or merely partially corrected) is preserved for head pose prediction in the next frame. This constant, $0^{th}$ order prediction for the magnetic tracker error is adequate for systems with frame rates which rarely exceed about 15 Hz in stereo. Higher-order prediction (linear, combining the magnetic tracker errors from the 2 most recent frames) may be utilized if the application and the tracking environment allow higher frame rates (e.g. non-stereo operation).

Figure 3:
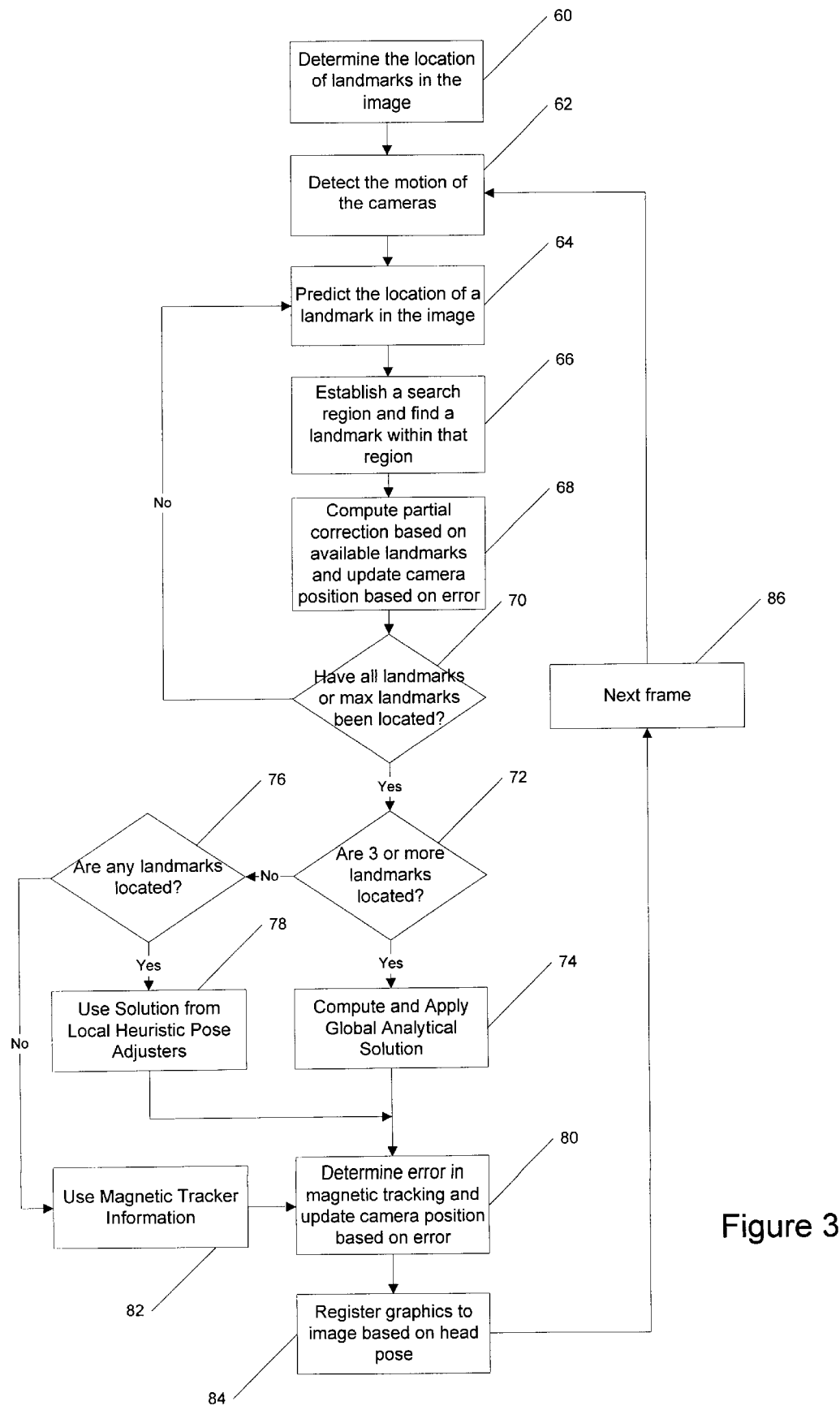
FIG. 3 is a flow chart of a method according to the present invention of registering a computer generated graphic to an image.

Having provided a general overview, the present invention will now be described more specifically with reference to FIG. 3. FIG. 3 is a flowchart illustration of methods, apparatus (systems) and computer program products according to the present invention. It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

As seen in FIG. 3, in block 60 the system determines the location of landmarks in a first image corresponding to the field of view of a user operated camera. This determination of landmarks creates initial landmark location value for each detected landmark within the image. As seen in block 61, the location and movement of the user operated camera is detected. This detection creates a camera displacement value. As a second image is obtained from the cameras the location of the landmark within the second image is predicted based on the camera displacement value and the initial landmark location value as seen in block 64. As block 66 illustrates, a search region is established within the second image based upon the predicted location of the landmark within the second image. Block 66 further indicates that a landmark is located within the defined search region of the second image to create an actual landmark location for that landmark.

As seen in block 68, the actual landmark location within the second image is compared with the predicted location of the landmark to generate a prediction error value and the camera location is updated based upon the prediction error value. As the decision block 70 indicates, blocks 64 through 68 are repeated for an image until either a maximum number of landmarks is obtained or all landmarks in the image are located.

As block 72 indicates, if three or more landmarks are located then the head pose is generated using the Global Analytical Solution described below for the well-determined and over-determined cases (block 74). If less than three landmarks are located, then, as blocks 76 and 82 indicate, if it is determined that no landmarks were located the magnetic tracking system information is utilized to determine head pose adjustment. If, however, one or two landmarks were located, then, as seen in block 78, the local heuristic pose adjusters described below are utilized to determine the head pose adjustment. Whichever method is utilized, when a final head pose is determined, the deviation of the magnetic tracking system value is determined and the camera position updated as reflected in block 80. The system then registers the graphics to the objects within the image based upon the determined head pose and gets the next frame for processing as seen in blocks 84 and 86.

As the above discussion makes clear, the present hybrid system may be viewed as two interrelated subsystems. These subsystems are the Landmark Tracking system and the Head Pose Determination system. Each of these systems are described in more detail below.

Landmark Tracking

Figure 5:
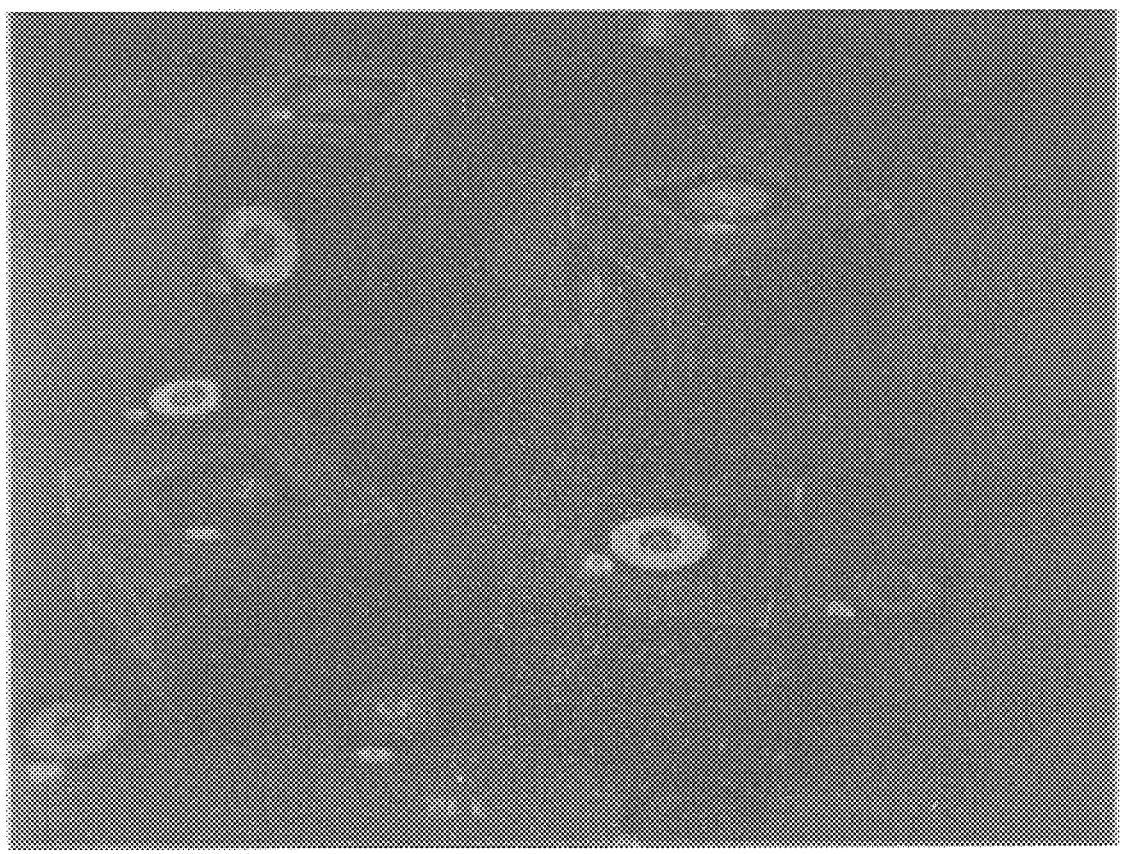
FIG. 5 is an augmented reality view according to the present invention showing the registration of computer generated graphics to an image.

FIG. 5 illustrates a view within a video-see-through HMD. As seen in FIG. 5, a tabletop model with cuboids and landmarks is accurately registered with a computer model of the cuboids (white wireframe lines). The landmarks for use in the present invention are preferably fiducial comprising two-color concentric circular dots. Eleven such landmarks are visible in FIG. 5. Each landmark consists of an inner dot and a surrounding outer ring with a diameter that is preferably about 3 times larger than the diameter of the inner dot. Different colors may be utilized to further distinguish landmarks. The landmarks illustrated in FIG. 5 utilized four colors (mixed from commercial fluorescent fabric paints), which were labeled as red, green, blue, and yellow and allowed for the creation of 12 unique combinations which can be recognized and identified by the Image Analyzer 42.

Figure 6:
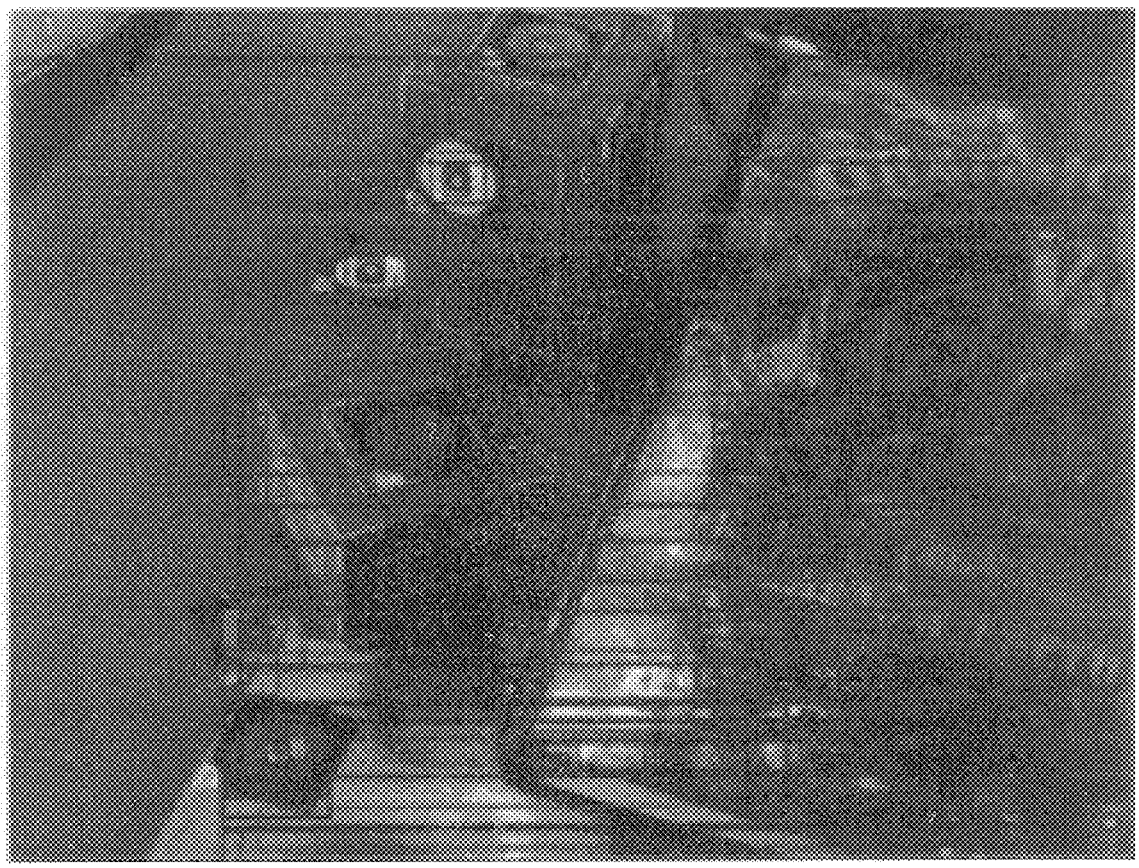
FIG. 6 is an augmented reality view according to the present invention showing the registration of computer generated graphics to an image and the expansion of bounding rectangles to include larger search areas.

Color landmarks are useful in several ways. Multiple colors simplify and accelerate low-level pixel inspection resulting in quick detection. The concentric layout further improves landmark detection from highly varying orientations and with partial occlusion. In contrast to a monochromatic landmark which may easily fool a search algorithm, the more complex structure of two-color landmarks makes spurious detection much more unlikely. The reduction in spurious detection is seen in FIG. 6 where registration is maintained despite the presence of spurious color spots.

The landmark finding subsystem consists of two main components: the Landmark Predictor 40, which predicts where the landmarks should be in the video camera image, and the Image Analyzer 42, which locates the landmarks in the image.

The main task of the Landmark Predictor 40 is to compute the expected positions and extents of landmarks in image space. For each landmark, a search area is determined based upon the predicted extent. Since the Image Analyzer 42 operates by exhaustive pixel searches inside search areas, it is important to keep the extents small. i.e. to "tightly" track the landmarks in image space with bounding boxes. An example of the bounding boxes is seen in FIG. 5.

As described above, the hybrid tracking system incrementally improves head pose after each newly-found landmark, thereby increasing the accuracy of the predicted positions and predicted extents of the remaining undetected landmarks. Lining up a single landmark often results in dramatically improved registration. Therefore lining up the first landmark detected often yields accurate search areas for the remaining landmarks, accelerating the subsequent searches When searching for the first landmark, there are no landmark-derived head pose corrections available. Therefore, it is important that the first landmark in each frame be easy to detect. This means the first landmark should have a relatively small search area and there should be a high probability of actually finding it within that area. To this end, the Landmark Predictor 40 keeps track of potentially detectable landmarks and sorts them in order of decreasing expected ease of detection. The Landmark Predictor 40 uses predicted and iteratively improved head poses to compute the expected positions of the landmarks in image space. In addition to this 3D prediction, the Landmark Predictor 40 performs an internal 2D image space prediction which is not based on input from the magnetic tracker 26, but only on detected landmarks. For each landmark, the 3D and 2D predictions are compared. If the distance between the two predicted positions is below a preset threshold or if the expected position is far enough from the edge of the image, then the landmark is assigned a high score for ease of detection.

Figure 7:
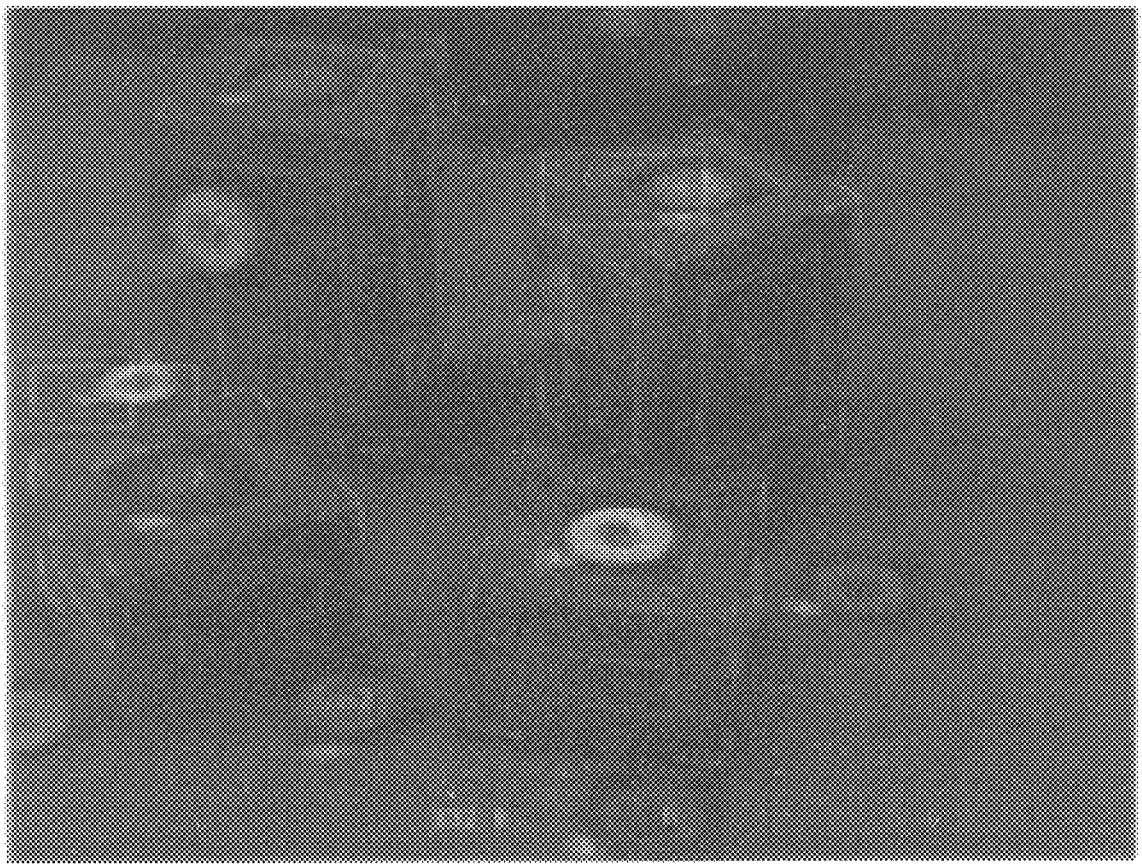
FIG. 7 is an augmented reality view according to the present invention showing the registration of computer generated graphics to an image despite spurious color spots.

The second component of the landmark finder is the Image Analyzer 42, which starts its search for a landmark by inspecting the search area defined by the Landmark Predictor 40. The first step is pixel marking. Every pixel is classified as belonging to one of the landmark colors or as belonging to no landmark based on the ratios of RGB component values of the pixel. The Image Analyzer 42 looks first for areas whose color matches the color of the outer ring of a concentric landmark and then attempts to locate the inner color dot within the identified area. The marked regions are segmented by horizontal and vertical signature to determine their centers of mass. If a marked region does not fit inside the bounding box of the search area, the search area is enlarged. The enlarging of search areas is seen in FIG. 7. For large search areas, a lower sampling density of as little as 1 in 64 (8×8) pixels is used initially: the sampling density is then successively increased as the Image Analyzer 42 reduces the search areas while refining its estimate of the landmark's location For all candidate detections consisting of an outer color ring and an inner color dot, two additional tests are performed:

(1) The number of marked pixels in both the inner dot and the outer ring are determined and their ratio is computed. In the present example where the diameter of the outer ring is 3 times the diameter of the inner dot, the ratio of marked pixels must be close to 3×3−1=8. If not, the candidate is rejected.

(2) If the centers of mass of the outer and inner regions are not within a predefined range or each other, the landmark may be partially occluded or clipped. The candidate is rejected.

For accepted candidates, the center of mass of the inner dot is taken as the center of the landmark. Using the center of only the inner dot instead of the average of the centers of the inner and outer areas is advantageous when a landmark becomes partially occluded. In such a case the outer ring will become occluded first, but as long as the landmark passes test (2) described above, the center will be computed correctly. When the occluding object starts approaching the center dot, the center of mass of the outer ring shifts noticeably and the candidate fails test (2) and is rejected. If such landmarks were not rejected, then the center would drift before the landmark disappears, corrupting the head pose solutions.

Head Pose Determination

Three cases arise when determining the head pose from landmarks. The landmarks represent a set of constraints that is under-determined, well-determined, or over-determined Until the image analyzer detects at least three different landmarks, the head pose cannot be completely determined from landmarks alone. In these cases, the magnetic tracker 26 is the primary source of information about head pose. A static position calibration lookup table and on-the-fly calibration for the magnetic tracker enable the use of multiple differing heuristic correctors. These heuristic correctors rely on the initial head position being reasonably accurate. After a first rough correction via the predicted magnetic tracker error, a local, heuristic adjustment is applied to the head pose. Different heuristic adjustment methods are used depending on the number of landmarks available.

The heuristic adjusters are-designed to ensure highest possible head pose and registration accuracy even when very few landmarks have been detected. These heuristic correctors bridge the gap between magnetic-only and vision-based operation. The adjusters are designed to improve head pose as smoothly as possible while more and more landmarks are detected. As a result of this, the hybrid tracker is characterized by reluctant degradation in accuracy when landmarks are lost. When landmarks are re-acquired, the system quickly recovers.

A total of six different under-determined cases exist for a stereoscopic system. The first case is where Camera 1 22 sees landmark A and Camera 2 24 sees no landmarks. Head position is not adjusted. Head orientation is corrected by lining up landmark A in the view of camera 1 22. Only two orientation degrees of freedom can be corrected. The remaining, uncorrected orientation degree of freedom is best described as "rotation about A."

In the second case, Camera 1 22 sees two landmarks, A and B and Camera 2 24 sees no landmarks. The method lines up both A and B in the view of camera 1 22 by reorienting the head. This orientation correction is preceded by a small position correction which is computed to minimize the rotation angle of the following orientation correction. In other words, the head is moved to a position from which the landmarks can be lined up by only minimally changing head orientation. In addition to the slight position adjustment, all three orientation degrees of freedom are corrected.

The third case involves Camera 1 22 seeing landmark A and Camera 2 24 seeing landmark B. This case is similar to the second case, except that the two landmarks appear in different camera views. Landmarks A and B are lined up in their respective camera views by reorienting the head after the initial position correction. All three orientation degrees of freedom can be corrected. Head position is adjusted slightly, similarly to the second case.

In the fourth case, Camera 1 22 sees landmark A and Camera 2 24 sees the same landmark A. The distance a from the head to landmark A is computed via triangulation in the two camera images and the head position adjusted by moving the head to the nearest point on a sphere of radius a centered at landmark A. In addition to this position adjustment, two out of the three orientation degrees of freedom can be corrected as in the first case.

The fifth possibility is that Camera 1 22 sees landmarks A and B and Camera 2 24 sees landmark A but not landmark B. This is a hybrid of the third and fourth cases. Landmark A is triangulated as in the fourth case, thereby determining its distance a from the head. Then a position adjustment to minimize orientation change is applied as in the third case, but with the additional constraint that the position be adjusted towards a point on the sphere of radius a, centered at landmark A's world space position. In addition to this slight position adjustment, all three orientation degrees of freedom can be corrected as in the third case.

In the sixth and final case, Camera 1 22 sees two landmarks, A and B, and Camera 2 24 sees the same two landmarks, A and B. Here the triangulation technique from the fourth case can be applied to both landmarks, yielding two spheres of diameters a and b which are centered at their respective landmarks' positions in world space. The two spheres intersect in a circle. The head position is adjusted by translating the head to a point on the circle from which the two landmarks can be lined up in the two views by only minimally correcting head orientation. In addition to the slight position change, the three orientation degrees of freedom can be adjusted with a method similar to the second case.

The above list covers all possible configurations of 1 or 2 landmarks with a binocular system. As soon as a third landmark is detected in one of the camera views, the system switches to the well-determined case. The methods of the well-determined and over-determined cases are based on global equation solvers.

If it is assumed that the head of the user is fixed and that it is the world as attached to landmarks that are moving. The actual head motion can be obtained as an inverse transformation of the landmarks' motions. In such a case, at least 3 positions of non-collinear points are required to determine a rigid three-space motion. Therefore, 3 non-collinear landmarks are essential. If 3 landmarks are found on the two cameras' image planes, these three landmarks provide 3 X-Y coordinate pairs. These 6 independent values are sufficient information to determine a 6-degree-of-freedom rigid motion for the head.

Figure 4:
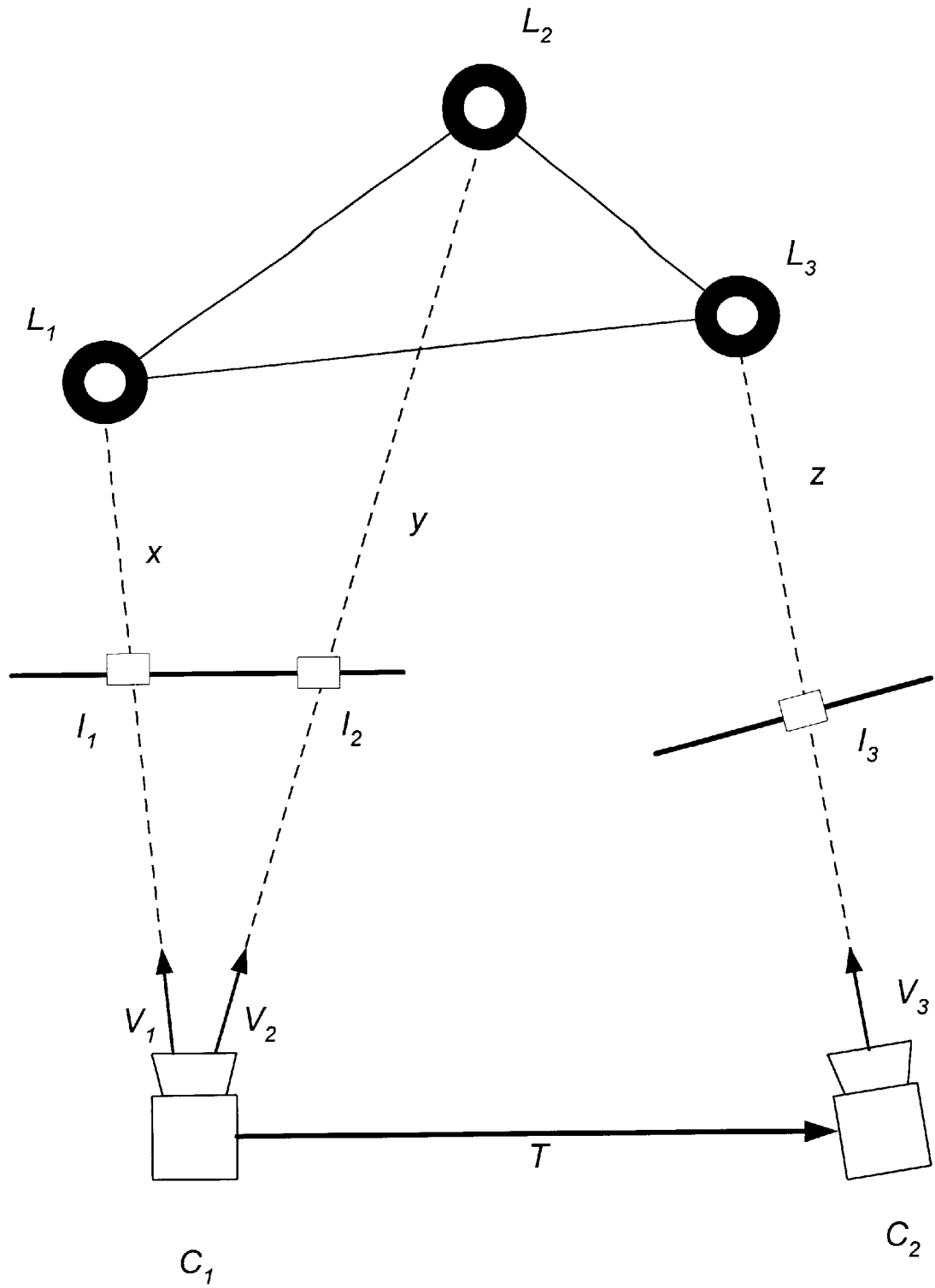
FIG. 4 is a diagram of the geometric relationship between three landmarks and two stereo cameras.

FIG. 4 shows the geometric relationships between two cameras $C_1$, and $C_2$ and three landmarks $L_1$, $L_2$ and $L_3$. The landmarks $L_1$, and $L_2$ are detected at $I_1$, and $I_2$ in the image of $C_1$, and the landmark $L_3$, is detected at $I_3$ in the image of $C_2$. The special case in which all three landmarks are detected by one camera can be treated as a case where $C_1=C_2$. Therefore, FIG. 4 may be considered as the general case.

The unit direction vectors $V_1$, $V_2$ and $V_3$, are obtained simply as:

$$V_1 = \frac{I_1 - C_1}{|I_1 - C_1|}, V_2 = \frac{I_2 - C_2}{|I_2 - C_2|}, V_3 = \frac{I_3 - C_3}{|I_3 - C_3|}$$

Because the triangle $L_1$-$L_2$-$L_3$ is undergoing rigid motion, its location is unknown. However, since the positions of $L_1$, $L_2$ and $L_3$, are known from landmark calibration, the lengths of the 3 edges may be computed. These lengths are:

$$L_{12}=|L_2-L_1|, L_{23}=|L_3-L_2|, L_{31}=|L_1-L_3|$$

Since both cameras are rigidly mounted on the head set, $T=C_2-C_1$, is also a constant measured through static calibration.

Thus, for x, y and z as:

$$x=|L_1-C_1|, y=|L_2-C_1|, z=|L_3-C_2|.$$

the result is:

$$L_{12}=|xV_1-yV_2|, L_{31}=|(T+zV_3)-xV_1|, L_{23}=|yV_2-(T+zV_3)|.$$

Taking the square of both sides results in:

$$a \qquad\qquad + b \cdot x \cdot y + x^2 + y^2 = 0$$
$$c + d \cdot y + e \cdot z + f \cdot y \cdot z + y^2 + z^2 = 0$$
$$g + h \cdot x + e \cdot z + j \cdot x \cdot z + x^2 + z^2 = 0$$

where $a \ldots j$ are constants given by:

$$a = -L_{12}^2, b = -2V_1 \cdot V_2, c = \|T\|^2 - L_{23}^2, d = -2T \cdot V_2,$$
$$e = 2T \cdot V3, f = -2V_2 \cdot V_3, g = \|T\|^2 - L_{31}^2 h = -2T \cdot V_1, \text{ and}$$
$$j = -2V_1 \cdot V_3$$

This is a system of equations consisting of 3 quadratic equations with 3 variables and a total degree of 2×2×2=8. The solutions of this system can be thought of as the intersection of three ellipsoidal cylinders with infinite extents in the x, y and z directions respectively.

If there is only one camera, i.e. T=0, then d, e and h vanish. In this special case, the following substitution reduces the above equations into a system with 2 quadratic equations:

$$x'=x/z \text{ and } y'=y/z.$$

For the general case the solution is more complicated. A global equation solver that utilizes resultants and polynomial matrices may be utilized to reduce the system to an eigenvalue problem. See e.g. Manocha, D., "Solving Systems of Polynomial Equations," *IEEE Computer Graphics and Applications*, (March 1994) pp. 46–55. X and y are eliminated from the system via Dixon's resultant. See Dixon, A. L., "The Elimination of Three Quantics in Two Independent Variables," *Proceedings of the London Mathematical Society*, 6 (1908), 46–69, pp. 209–236. The resultant is a determinant of a 6×6 matrix where each element is up to degree 3 in terms of z. The matrix can be written as a matrix polynomial:

$$M(z)=M_3z^3+M_2z^2+M_1z+M_0.$$

Since $M_3$ is singular, substituting z'=1/z into the above equation results in:

$$M'(z')=M_0z'^3+M_1z'^2+M_2z'+M_3.$$

Solutions are then sought for z' such that detM'(z')=0. Solutions can be found for z' as eigenvalues of the companion matrix of M'(z').

Once z', is obtained, z=1/z' is substituted into the above system of equations, and an (x,y) solution pair that satisfies the three equations can be found.

There are eight solutions to the system of equations, so the most sound solution must be found among the 8 solutions. In general, imaginary solutions are trivially rejected, and the physics of the cameras results in the discarding of all negative solutions. Typically, two positive solutions are found. Then the problem is how to disambiguate between these two positive solutions.

If the Image Analyzer 42 has detected additional landmarks (that is, in addition to the ones used to solve the equations), these landmarks can be used for disambiguation. Using each remaining candidate solution of the camera, the additional landmarks are projected onto the image planes and are checked to determine how closely the projections match the detected positions. This matching error method works most of the time, however, there may be degenerate cases in which two or more extra landmarks project to exactly the same position in the image. In addition, errors in landmark detection may prevent rejection of solutions with small matching errors. However, the most problematic case occurs when no redundant landmarks exist, i.e. when all three available landmarks have been used for equation solving.

In such cases the magnetic tracker is utilized to disambiguate the solutions. Unless the two solutions are very close to each other, the solutions can be disambiguated by selecting the solution that best matches the magnetic tracker's readings.

Since the equation solver uses only the minimum necessary number of landmarks, it is sensitive to landmark tracking error. Least square error minimization allows for the determination of an optimum solution using all the detected landmarks. This process neutralizes fluctuations in landmark tracking and significantly stabilizes the final head pose, thereby yielding superior frame to-frame coherence in registration.

The optimization process is local and depends on the availability of a good initial guess. In any case, the optimizer will converge towards a single solution. It is, therefore, not advisable to use the optimizer in under determined cases, due to the infinite number of solutions. Similarly, in well-determined cases, the number of solutions is finite, but invoking the optimizer would result in convergence towards a single solution. This would preclude inspecting the multiple solutions with the goal of selecting the best one. Therefore, the optimizer is preferably invoked only when a good approximate solution has been found via the methods described above.

The mathematical relationships between the user's head, the head-mounted camera, a landmark and the projected image of the landmark as seen by the camera are:

$$\begin{bmatrix} I_x \\ I_y \end{bmatrix} = \begin{bmatrix} I_x/I_z \\ I_y/I_z \end{bmatrix}$$

$$\begin{bmatrix} I_x \\ I_y \\ I_z \end{bmatrix} = \begin{bmatrix} 1 & 0 & 0 \\ 0 & 1 & 0 \\ 0 & 0 & \frac{1}{f} \end{bmatrix} [R_c \mid -R_c T_c] \begin{bmatrix} R_h & -R_h T_h \\ 000 & 1 \end{bmatrix} \begin{bmatrix} L_x \\ L_y \\ L_z \\ 1 \end{bmatrix}$$

In the above equations, $T_h$ is a 3D vector representing the position of the head in the world space;

$R_h$ is a 3×3 rotation matrix representing the orientation of the head in world space;

$T_c$, is a 3D vector representing the position of the camera in the head coordinate system;

$R_c$, is a 3×3 rotation matrix representing the orientation of the camera in the head coordinate system;

f is the focal length;

$(L_x, L_y, L_z)$ is the position of a landmark in world space;

$(I_x, I_y)$ is the projected position of the landmark in image space; and $(I_x', I_y', I_z')$ is the projected position of the landmark in homogeneous image space; and $I_x'$, $I_y'$ and $I_z'$ of can be eliminated by combination of the two equations and the relationship can be written simply as:

$$F_x = I_x - P_x(L_x, L_y, L_z) = 0,$$

and $$F_y = I_y - P_y(L_x, L_y, L_z) = 0$$

where $P_x$ and $P_y$ are a combined transformation function that maps a world coordinate to a 2D image coordinate. All values except for $T_h$ and $R_h$ are given, therefore $F_x$ and $F_y$ are functions of $T_h$ and $R_h$:

$$F_x(T_h, R_h) = 0 \text{ and } F_y(T_h, R_h) = 0.$$

Let $(t_x, t_y, t_z)$ be the three components of $T_h$. $R_h$ has 9 elements, but a rotation has only 3 real degrees of freedom. This means $R_h$ can be expressed as simple rational functions of 3 variables, u, v and w. These parameters may be defined as follows. First the initial orientation is converted to a quaternion, then a hyperplane is defined such that it is tangential to the unit hypersphere at the point corresponding to this initial quaternion. Finally u, v and w are defined as a 3D coordinate system in the hyperplane. Hence, the above equation can also be written as:

$$F_x(t_x, t_y, t_z, u, v, w) = 0 \text{ and } F_y(t_x, t_y, t_z, u, v, w) = 0.$$

If we find n landmark-projection pairs, using (7) we can set up a system of 2n equations with 6 variables.

Since $I_x$ and $I_y$ are measured values, $F_x$ and $F_y$ may not vanish. Instead, they should be considered measurement errors in image space.

If the total number of distinct landmarks detected by the two cameras is at least 3, and the total number of landmark projection pairs detected is at least 4, then this system is over determined. In this case the system must be solvable as a non-linear, least-square minimization problem using iterative methods. This solution may be obtained utilizing the Levenberg-Marquardt algorithm. See More et al., "User Guide for MINPACK-1," *Argonne National Laboratory Report ANL-80-74* (1980) and Fletcher, R., *Practical Methods of Optimization*, John Wiley & Sons, Inc., New York (1987). Since a good initial guess is provided by the previously described analytical methods, an optimized solution is computed in only a few milliseconds.

The hybrid tracking system of the present invention may also be utilized with a single camera (non-stereo). In that case, none of the binocular solution methods are applied. This means that only the first two cases of heuristic adjusters discussed above need be used and only the simplified monocular global three-landmark solver need be used. Local optimization is performed using only landmarks visible in one camera.

Static Calibration

The initial calibration of the system determines numerous static parameters that are required by the tracking procedures described above. The following list describes the static calibration procedures.

(1) Camera-to-magnetic-sensor transformation: The transformation between a camera and the magnetic tracker's sensor is calculated using an iterative procedure.

(2) Intrinsic camera parameters: Camera lenses are preferably selected for their low distortion characteristics which is preferably well below 1% barrel distortion in the corners of the image. This allows for a simple mathematical camera model in the system. The model may be a pin-hole model (no distortion, no skew, 1:1 aspect ratio). This model has only three intrinsic degrees of freedom, which are defined as the 3D coordinates of the center of projection with respect to the CCD camera's pixel array. Note that the focal length is in fact equal to one of the three coordinates. These coordinates are calibrated for each camera individually using the vision-based tracker. First each camera is positioned to see as many landmarks as possible. Then the landmark tracking procedure described above is executed. The residual error of the least square optimization is an indicator of the accuracy of the estimated intrinsic parameters. An optimization method is then applied to find values for the intrinsic parameters that minimize the residual error.

(3) Interocular Transformation: To calculate the transformation between the left and right cameras, the intrinsic parameters are first calibrated as described above. Then the hybrid tracker is operated in dual-mono modes i.e., by tracking and correcting each camera individually. In this mode, the transformation between the cameras is not used in the tracking algorithms. It can be computed as the transformation between the cameras' coordinate systems as they are determined by the vision-based tracker. For accurate results, each of the two cameras should see at least three, but preferably more landmarks. The data acquired over 10 frames is averaged to reduce the effect of landmark tracking errors. This interocular calibration procedure is fast enough for real time execution if desired.

(4) Landmark centers: The world space positions of all the landmark centers are acquired using a precise mechanical arm (FARO Metrecom IND-1).

To evaluate the registration performance of a system according to the present invention, the tabletop scene shown in FIGS. 5 through 10 was constructed. The real world cuboids were registered to computer models. The registration errors are represented by the distances between computer-generated edges and the corresponding real world edges. Typically these errors are below 1 pixel.

Figure 8:
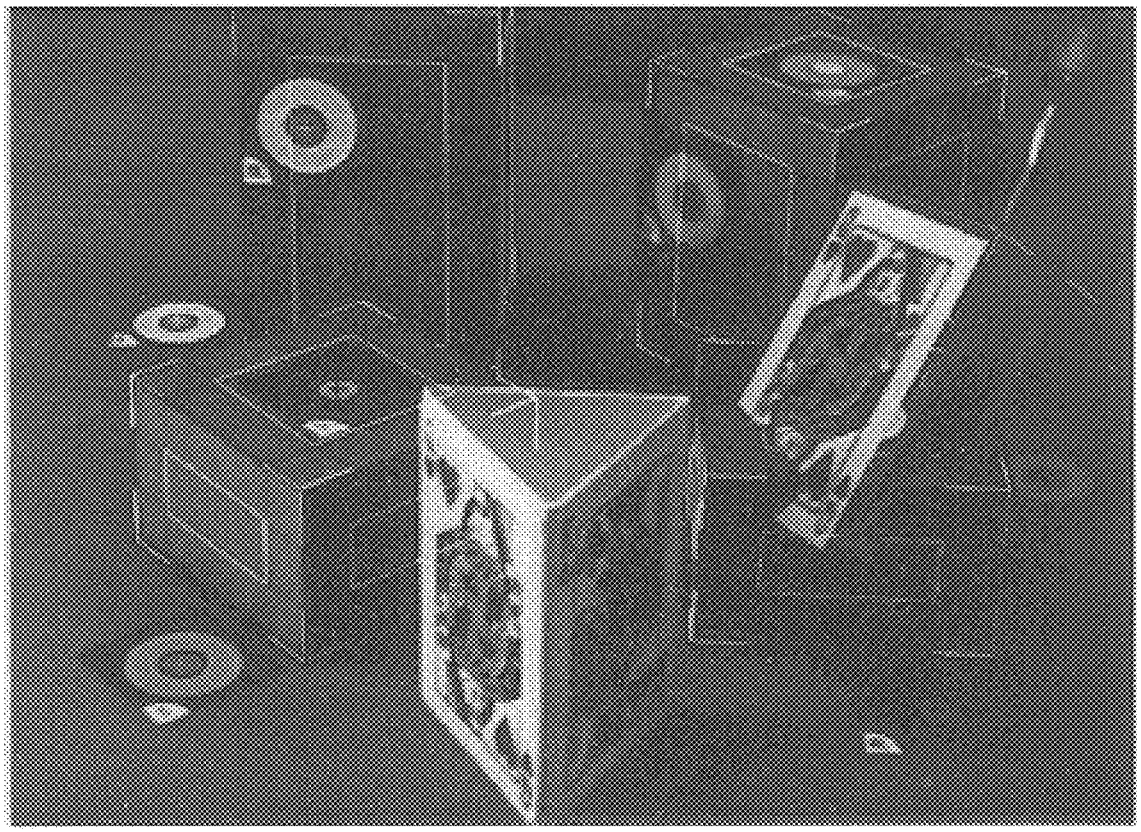
FIG. 8 is a first example of an augmented reality view according to the present invention showing the registration of computer generated graphics to an image.

The registration accuracy of present invention was verified in three experimental AR systems. FIG. 8 demonstrates a 3D copy and paste operation in which a virtual copy is made of a real object. The user manipulates the virtual copy of the card prism. Notice that the virtual prism intersects with the real cuboids in a convincing manner. For the 3D copy operation, the real card prism is measured with the mechanical arm. After each face is defined by digitizing its vertices, a texture is extracted from the camera image and is applied to the face.

Figure 9:
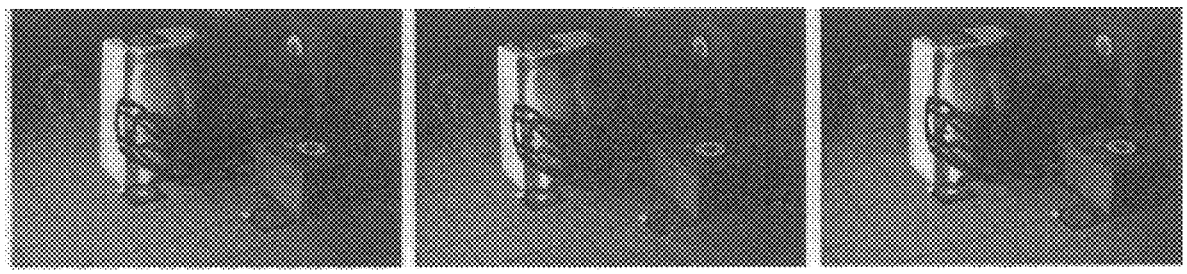
FIG. 9 is a second example of an augmented reality view according to the present invention showing the registration of computer generated graphics to an image.
Figure 10:
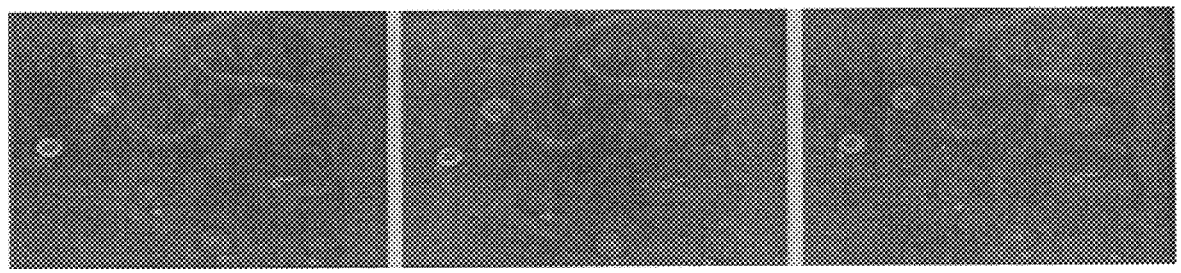
FIG. 10 is a third example of an augmented reality view according to the present invention showing the registration of computer generated graphics to an image.

FIG. 9 demonstrates a virtual object, a knot, casting a shadow on a real object, a sculpture. The geometry of the sculpture was digitized with the mechanical arm and placed in the scene. The (real) light source is tracked (by the mechanical arm), and the shadow map is calculated in real-time. FIG. 10 shows a similar scene. The knot intersects the real objects, emphasizing the accurate registration of the synthetic imagery (the knot and its shadow) with the real cuboids.

In the drawings, specification and examples, there have been disclosed typical preferred embodiments of the invention and, although specific terms are employed, these terms are used in a generic and descriptive sense only and not for purposes of limitation, the scope of the invention being set forth in the following claims.

That which is claimed is:

1. A method of registering a computer generated graphic to objects in the real world to provide a composite augmented reality image, the method comprising:

obtaining a first image corresponding to the field of view of a camera;

determining the location within the first image of a landmark to create an initial landmark location;

detecting the physical movement of the user operated camera to create a camera displacement;

obtaining a second image corresponding to the field of view of the camera;

predicting the location of the landmark within the second image based on the camera displacement that reflects the physical movement of the camera independent of the first and second images obtained by the camera and the initial landmark location determined from the first image;

defining a search region within the second image based upon the predicted location of the landmark within the second image;

locating the landmark within the defined search region of the second image to create an actual landmark location; and registering the computer generated graphic to objects in the real world based upon the actual landmark location so as to provide a composite augmented reality image.

2. A method according to claim 1, further comprising the steps of:

comparing the actual landmark location within the second image with the predicted location of the landmark to generate a prediction error; and updating a camera location based upon the camera displacement and the prediction error.

3. A method according to claim 1, wherein said registering step comprises the steps of:

determining the head pose of the camera based upon the actual landmark location; and registering the computer generated graphic to objects in the real world based upon the determined head pose of the camera.

4. A method according to claim 1, wherein said determining step comprises determining the location within the first image of a plurality of landmarks to create an initial landmark location for each of said plurality of landmarks;

wherein said predicting step comprises predicting the location of each of said plurality of landmarks within the second image based on the camera displacement and the initial landmark location corresponding to the landmark; and wherein said defining step comprises defining a plurality of search regions within the second image based upon the predicted location of the plurality of landmarks within the second image;

wherein said locating step comprises locating each of the plurality of landmarks within the defined search region of the second image to create an actual landmark location for each of said landmarks; and wherein said registering step comprises registering the computer generated graphic to objects in the real world based upon the actual landmark location of said plurality of landmarks.

5. A method according to claim 4, wherein said registering step comprises the steps of:

determining the head pose of the camera based upon the actual location of said plurality of landmarks; and registering the computer generated graphic based upon the head pose of the camera.

6. A method according to claim 5 further comprising the steps of:

evaluating the number of landmarks located within the region by said locating step to determine whether a sufficient number landmarks have been located within the image to register the computer generated graphic based upon actual landmark location; and registering the computer generated graphic based upon the camera displacement if said evaluating step determines that an insufficient number of landmarks have been located within the image to register the computer generated graphic.

7. A method according to claim 5 further comprising the steps of:

evaluating the number of landmarks located within the region by said locating step to determine whether three or more landmarks have been located within the image; and wherein said step of determining the head pose comprises determining the head pose utilizing a global analytical solution.

8. A method according to claim 7, wherein a final solution to said global analytical solution is determined based upon the camera displacement.

9. A method according to claim 5 further comprising the steps of:

evaluating the number of landmarks located within the region by said locating step to determine whether one or two landmarks have been located within the image; and wherein said step of determining the head pose comprises determining the head pose utilizing a heuristic corrector and the camera displacement.

10. A method according to claim 4, wherein said plurality of landmarks comprise a plurality of fiducials.

11. A method according to claim 4, wherein the camera comprises two cameras and wherein the image comprises a pair of stereoscopic images.

12. A method according to claim 1, wherein said landmark comprises a fiducial.

13. A method according to claim 1, wherein the camera displacement is determined by a magnetic tracking system.

14. A system for registering computer generated graphic to objects in the real world to provide a composite augmented reality image, comprising:

a user operated camera;

means for obtaining a first image corresponding to the field of view of the camera;

means for determining the location within the first image of a landmark to create an initial landmark location;

means for detecting the physical movement of the user operated camera to create a camera displacement;

means for obtaining a second image corresponding to the field of view of said camera;

means for predicting the location of the landmark within the second image based on the camera displacement that reflects the physical movement of the camera independent of the first and second images obtained by the camera and the initial landmark location determined from the first image;

means for defining a search region within the second image based upon the predicted location of the landmark within the second image;

means for locating the landmark within the defined search region of the second image to create an actual landmark location; and means for registering the computer generated graphic to objects in the real world based upon the actual landmark location so as to provide a composite augmented reality image.

15. A system according to claim 14, further comprising:

means for comparing the actual landmark location within the second image with the predicted location of the landmark to generate a prediction error; and means for updating a camera location based upon the camera displacement and the prediction error.

16. A system according to claim 14, wherein said means for registering comprises:

means for determining the head pose of the camera based upon the actual landmark location; and means registering the computer generated graphic to objects in the real world based upon the determined head pose of the camera.

17. A system according to claim 14, wherein said means for determining comprises means for determining the location within the first image of a plurality of landmarks to create an initial landmark location for each of said plurality of landmarks;

wherein said means for predicting comprises means for predicting the location of each of said plurality of landmarks within the second image based on the camera displacement and the initial landmark location corresponding to the landmark;

wherein said means for defining comprises means for defining a plurality of search regions within the second image based upon the predicted location of the plurality of landmarks within the second image;

wherein said means for locating comprises means for locating each of the plurality of landmarks within the defined search region of the second image to create an actual landmark location for each of said landmarks; and wherein said means for registering comprises means for registering the computer generated graphic to objects in the real world based upon the actual landmark location of said plurality of landmarks.

18. A system according to claim 17, wherein said means for registering comprises:

means for determining the head pose of the camera based upon the actual location of said plurality of landmarks; and means for registering the computer generated graphic based upon the head pose of the camera.

19. A system according to claim 18 further comprising:

means for evaluating the number of landmarks located within the region by said means for locating to determine whether a sufficient number landmarks have been located within the image to register the computer generated graphic based upon actual landmark location; and means for registering the computer generated graphic based upon the camera displacement if said means for evaluating determines that an insufficient number of landmarks have been located within the image to register the computer generated graphic.

20. A system according to claim 19 further comprising:

means for evaluating the number of landmarks located within the region by said means for locating to determine whether three or more landmarks have been located within the image; and wherein said means for determining the head pose comprises means for determining the head pose utilizing a global analytical solution.

21. A system according to claim 18, wherein said plurality of landmarks comprise a plurality of fiducials.

22. A system according to claim 20, wherein a final solution to said global analytical solution is determined based upon the camera displacement.

23. A system according to claim 19 further comprising:
means for evaluating the number of landmarks located within the region by said means for locating to determine whether one or two landmarks have been located within the image; and
wherein said means for determining the head pose comprises means for determining the head pose utilizing a heuristic corrector and the camera displacement.

24. A system according to claim 18, wherein the camera comprises two cameras and wherein the image comprises a pair of stereoscopic images.

25. A system according to claim 14, wherein said means for detecting movement comprises a magnetic tracking system.

26. A computer program product for registering computer generated graphic to objects in the real world to provide a composite augmented reality image, the computer program product comprising:
a computer-readable storage medium having computer-readable program code means embodied in said medium, said computer-readable program code means comprising:
computer-readable program code means for obtaining a first image corresponding to the field of view of the camera;
computer-readable program code means for determining the location within the first image of a landmark to create an initial landmark location;
computer-readable program code means for detecting the physical movement of the user operated camera to create a camera displacement;
computer-readable program code means for obtaining a second image corresponding to the field of view of said camera;
computer-readable program code means for predicting the location of the landmark within the second image based on the camera displacement that reflects the physical movement of the camera independent of the first and second images obtained by the camera and the initial landmark location value determined from the first image;
computer-readable program code means for defining a search region within the second image based upon the predicted location of the landmark within the second image;
computer-readable program code means for locating the landmark within the defined search region of the second image to create an actual landmark location; and
computer-readable program code means for registering the computer generated graphic to objects in the real world based upon the actual landmark location so as to provide a composite augmented reality image.

27. A computer program product according to claim 26, further comprising:
computer-readable program code means for comparing the actual landmark location within the second image with the predicted location of the landmark to generate a prediction error; and
computer-readable program code means for updating a camera location based upon the camera displacement and the prediction error.

28. A computer program product according to claim 26, wherein said computer-readable program code means for registering comprises:
computer-readable program code means for determining the head pose of the camera based upon the actual landmark location; and
computer-readable program code means registering the computer generated graphic to objects in the real world based upon the determined head pose of the camera.

29. A computer program product according to claim 26, wherein said computer-readable program code means for determining comprises computer-readable program code means for determining the location within the first image of a plurality of landmarks to create an initial landmark location for each of said plurality of landmarks;
wherein said computer-readable program code means for predicting comprises computer-readable program code means for predicting the location of each of said plurality of landmarks within the second image based on the camera displacement and the initial landmark location corresponding to the landmark;
wherein said computer-readable program code means for defining comprises computer-readable program code means for defining a plurality of search regions within the second image based upon the predicted location of the plurality of landmarks within the second image;
wherein said computer-readable program code means for locating comprises computer-readable program code means for locating each of the plurality of landmarks within the defined search region of the second image to create an actual landmark location for each of said landmarks; and
wherein said computer-readable program code means for registering comprises computer-readable program code means for registering the computer generated graphic to objects in the real world based upon the actual landmark location of said plurality of landmarks.

30. A computer program product according to claim 29, wherein said computer-readable program code means for registering comprises:
computer-readable program code means for determining the head pose of the camera based upon the actual location of said plurality of landmarks; and
computer-readable program code means for registering the computer generated graphic based upon the head pose of the camera.

31. A computer program product according to claim 32 further comprising:
computer-readable program code means for evaluating the number of landmarks located within the region by said computer-readable program code means for locating to determine whether a sufficient number landmarks have been located within the image to register the computer generated graphic based upon actual landmark location; and
computer-readable program code means for registering the computer generated graphic based upon the camera displacement if said computer-readable program code means for evaluating determines that an insufficient number of landmarks have been located within the image to register the computer generated graphic.

32. A computer program product according to claim 31, wherein the camera comprises two cameras and wherein the image comprises a pair of stereoscopic images.

33. A computer program product according to claim 30 further comprising:

computer-readable program code means for evaluating the number of landmarks located within the region by said computer-readable program code means for locating to determine whether one or two landmarks have been located within the image; and wherein said computer-readable program code means for determining the head pose comprises computer-readable program code means for determining the head pose utilizing a heuristic corrector and the camera displacement.

34. A computer program product according to claim 29 further comprising:

computer-readable program code means for evaluating the number of landmarks located within the region by said computer-readable program code means for locating to determine whether three or more landmarks have been located within the image; and wherein said computer-readable program code means for determining the head pose comprises computer-readable program code means for determining the head pose utilizing a global analytical solution.

35. A computer program product according to claim 34, wherein a final solution to said global analytical solution is determined based upon the camera displacement.

* * * * *

UNITED STATES PATENT AND TRADEMARK OFFICE
CERTIFICATE OF CORRECTION

PATENT NO. : 6,064,749
DATED : May 16, 2000
INVENTOR(S) : Hirota et al.

It is certified that error appears in the above-identified patent and that said Letters Patent is hereby corrected as shown below:

Title page,
Item [76] Please delete "100 Rockhaven Rd. #J101, Carrboro, N.C. 28510" and substitute -- 1000 Smith Level Rd., #E2, Carrboro, N.C. 27510 -- therefor.

Item [56] References Cited - Other Publications - Page 2 - J.P. Mellor, please delete "Apr. 305, 1995" and substitute -- Apr. 30, 1995 -- therefor.

Item [57] Line 6, please delete "physical" and substitute -- physically -- therefor.
Line 16, please delete "may be utilized".

Column 1,
Lines 31-32, please delete "the user".
Line 41, please delete "stereosis" and substitute -- stereopsis -- therefor.

Column 7,
Line 59, please delete "Post" and substitute -- Pose -- therefor.

Column 8,
Line 3, please delete "is the utilized" and substitute -- is utilized -- therefor.

Column 9,
Line 55, please delete "block 61" and substitute -- block 62 -- therefor.

Column 11,
Line 10, please add a period at the end of the sentence.
Line 49, please add a period at the end of the sentence.

Column 12,
Line 12, please add a period at the end of the sentence.

Column 14,
Line 17, please delete "e = 2T V3" and substitute -- $e = 2T\ V_3$ -- therefor.

UNITED STATES PATENT AND TRADEMARK OFFICE
CERTIFICATE OF CORRECTION

PATENT NO.    : 6,064,749
DATED         : May 16, 2000
INVENTOR(S)   : Hirota et al.

It is certified that error appears in the above-identified patent and that said Letters Patent is hereby corrected as shown below:

Column 15,
Line 48, please delete "000" and substitute -- 0 0 0 -- therefor.

Column 22,
Line 52, please delete "32" and substitute -- 26 -- therefor.

Signed and Sealed this

Second Day of October, 2001

Attest:

*Nicholas P. Godici*

NICHOLAS P. GODICI
*Attesting Officer*  *Acting Director of the United States Patent and Trademark Office*